(12) United States Patent
Dunn et al.

(10) Patent No.: US 6,429,934 B1
(45) Date of Patent: Aug. 6, 2002

(54) OPTIMAL SYMBOLOGY ILLUMINATION-APPARATUS AND METHOD

(75) Inventors: Sheila B. Dunn, Mason; John J. Merva, Weare, both of NH (US); Howard Stern, Greelawn, NY (US)

(73) Assignee: Robotic Vision Systems, Inc., Canton, MA (US)

( * ) Notice: Subject to any disclaimer, the term of this patent is extended or adjusted under 35 U.S.C. 154(b) by 0 days.

(21) Appl. No.: 09/512,835

(22) Filed: Feb. 25, 2000

Related U.S. Application Data (63) Continuation-in-part of application No. 09/151,765, filed on Sep. 11, 1998.

(51) Int. Cl.[7] .......................... G01N 21/01; G02B 7/04; B06N 7/10
(52) U.S. Cl. ................. 356/244; 356/445; 356/446; 250/566; 235/472.01; 235/462.32
(58) Field of Search ................... 356/445, 446, 356/448, 244; 250/566; 235/454, 472.01, 462.32, 462.45

(56) References Cited

U.S. PATENT DOCUMENTS

| | | | | |
|---|---|---|---|---|
| 5,140,141 A | * | 8/1992 | Inagaki et al. | 235/462 |
| 5,469,294 A | * | 11/1995 | Wilt et al. | 356/401 |
| 5,641,958 A | * | 6/1997 | Rudeen | 235/472 |
| 5,737,122 A | * | 4/1998 | Wilt et al. | 356/401 |
| 6,066,857 A | * | 5/2000 | Fantone et al. | 250/566 |
| 6,098,887 A | * | 8/2000 | Figarella | 235/472.01 |

* cited by examiner

Primary Examiner—Frank G. Font
Assistant Examiner—Roy M. Punnoose
(74) Attorney, Agent, or Firm—Morris I. Pollack (57) ABSTRACT

An imager for illuminating and imaging encoded symbology to facilitate decoding of the symbology and which provides both "bright field" and "dark field" illumination patterns is provided with an illumination directing device to direct the "bright field" illumination pattern into an alternative "dark field" illumination pattern. In one embodiment the illumination directing device takes the configuration of a disc that is selectively positionable in front of the imager and removable therefrom depending upon whether or not the illumination pattern is to be changed. The disc snap fits into a position at the front of the imager housing and includes a fresnel configured outer ring, a light blocking inner ring, and a light transmissive center. The fresnel configuration receives light and redirects the light forward of the imager and towards a center line passing through the device to provide the alternative illumination pattern. Other embodiments of illumination directing devices are to be carried by the imager for disposition in either operative or inoperative positions; while still other embodiments of illumination directing devices selectively position collimating lenses and reflective surfaces to receive and redirect light from the images or permit the light from the imager to provide an unmodified illumination pattern.

24 Claims, 9 Drawing Sheets

OPTIMAL SYMBOLOGY ILLUMINATION-APPARATUS AND METHOD

CROSS-REFERENCE TO RELATED APPLICATIONS

This application is a continuation-in-part of copending application Ser. No. 09/151,765 filed Sep. 11, 1998 under the title "Diffuse Surface Illumination Device", and assigned to the assignee of the instant application (still pending).

BACKGROUND OF THE INVENTION—FIELD OF USE

This invention relates to the optimal and uniform illumination of surfaces, which may be specular or irregular, and to the uniform illumination of machine readable codes, symbologies and the like that may be applied directly to such surfaces or to symbology carrying media that is, in turn, applied to such surfaces. More particularly, this invention relates to optimal and uniform illumination of surfaces, codes, symbologies or the like to facilitate imaging and successful decoding of machine readable codes, symbology or the like.

BACKGROUND OF THE INVENTION—DESCRIPTION OF THE PRIOR ART

It is quite often necessary to determine the existence, location or characteristics of an article through automated means for automated purposes. Robotic handling of parts for processing such as machining or assembly purposes and automated sorting, transportation, manipulation and other handling of parts, components, packages and the like usually requires that some form of machine readable code or symbology be applied to the article. At times it is convenient to apply the symbology to a media such as a pressure sensitive label. Other times it is more desirable and possibly efficient to apply the symbology directly to the article. The symbology may be a conventional bar code, a stacked bar code or other 2-D symbology.

Machine reading of symbology, as by a stationary or hand-held reader or imager, requires proper illumination of the targeted symbology. This may present problems if the media carrying the symbology is applied to an irregular or curved surface. The problems are more pronounced if the symbology is applied directly to the article and the article surface is normally specular and/or the article's surface is irregular.

Imaging and decoding a 1-D or 2-D symbology requires that the ones and zeros of the symbology be discernable for the decoding algorithms, which, in turn, requires that proper contrast between the ones and zeroes be obtained during the imaging process. Particularly when imaging a 2-d symbology, it is not important whether the ones are dark or light with respect to the zeroes; it is only important that the contrast between the two states is sufficient for adequate separation. For example, when the symbology is printed as a black code on a white background or as a white code on a black background, the code will be easily discernable in almost any illumination if the code and the background are both surfaces having a matte reflectivity. The matte surfaces ensure that regardless of the direction from which they are illuminated, the light reflected from them will be smoothly distributed over a wide angular distribution and so will provide adequate illumination into the camera lens. This situation is usually achieved when the symbologies are printed on labels that are affixed to parts or components.

However, labels are easily tampered with and often fragile compared to the parts or components to which they are attached. Therefore, it is often advantageous to mark the symbology directly on the parts or components. Unfortunately, parts and components often have specular (mirror like) surfaces which do not distribute the light uniformity over a wide angular distribution but rather redirect the light rays such that the angle of reflection is exactly equal to the angle of incidence. If the illumination comes from a small source (a source having a small angular extent as viewed from the specular surface being illuminated) it is highly likely that the light reflected from the surface will miss the camera lens and so the surface will appear to be "black". Conversely, if the small light source is positioned such that the angle of reflection directs the light rays from the source directly into the camera lens the light rays may be overwhelmingly bright and so make the surface appear to be "white". Thus, we have an intolerable situation because the surface may appear to be either "black" or "white" according to very small changes in the exact angular relationship between the specular surface being imaged, the light source, and the camera lens. This situation is especially deleterious when the symbology being imaged is on a surface that is simultaneously specular and curved so that some portions appear to be bright and other portions appear to be dark.

SUMMARY OF THE INVENTION

It is therefore an object of this invention to provide new and novel surface illumination apparatus.

It is another object of this invention to provide new and novel methods of surface illumination.

It is yet another object of this invention to provide new and novel optimal illumination of surfaces which carry machine readable coded information.

It is another object of this invention to provide new and novel optimal illumination of specular and otherwise irregular surfaces upon which there is disposed machine readable coded symbology.

It is yet still another object of this invention to provide new and novel apparatus and methods for hand-held optimal illumination of machine readable coded symbology.

It is yet a further object of this invention to provide new and novel apparatus and methods for hand-held optimal illumination of machine readable, coded symbology applied directly to parts and components.

It is yet still a further object of this invention to provide new and novel apparatus and methods for illumination of machine readable codes of black and white cells, and/or cells of other differing and contrasting colors, which illuminates such cells so as to optimize the contrast between such differing and contrasting colors for optimal separation of the respective differing and contrasting colors when imaging same to facilitate successful decoding thereof.

It is yet still a further object of this invention to provide new and novel apparatus and methods for readily effecting modification of the illumination provided by a symbology imaging device through an attachment to the imaging device which, when attached to the imaging device, re-directs the imaging device's illumination so as to further illuminate and enhance symbology of differing and contrasting colors to be imaged to facilitate imaging and decoding of the symbology and which, when detached from the imaging device or rotated to an alternate position, permits the imaging device's original illumination modes to be employed.

It is yet still a further object of this invention to provide new and novel apparatus and methods for illuminating symbology carried by parts, components and the like to facilitate optimal decoding of the symbology.

It is yet a further object of this invention to provide new and novel hand-held apparatus and methods for applying optimal uniform illumination to symbology directly applied to parts, components and the like to effect decoding of the symbology.

It is yet still a further object of this invention to provide new and novel apparatus and methods for modification of the illumination provided by a symbology imaging device by including, as a component of the imaging device, an illumination directing member selectively positionable between first and second dispositions; wherein the first disposition permits illumination to be projected in a first manner and wherein the second disposition re-directs the illumination to project same in a second manner.

It is yet still a further object of the invention to provide new and novel apparatus and methods for illumination provided by a hand-held symbology imaging device to selectively provide "bright field" illumination or "dark field" illumination from the same illumination source.

Other objects, features and advantages of the inventions in their methods and details of construction and arrangement of parts will be seen from the above, from the following description of the preferred embodiments when considered with the drawings and from the appended claims.

DESCRIPTION OF THE PREFERRED EMBODIMENT

Figure 1:
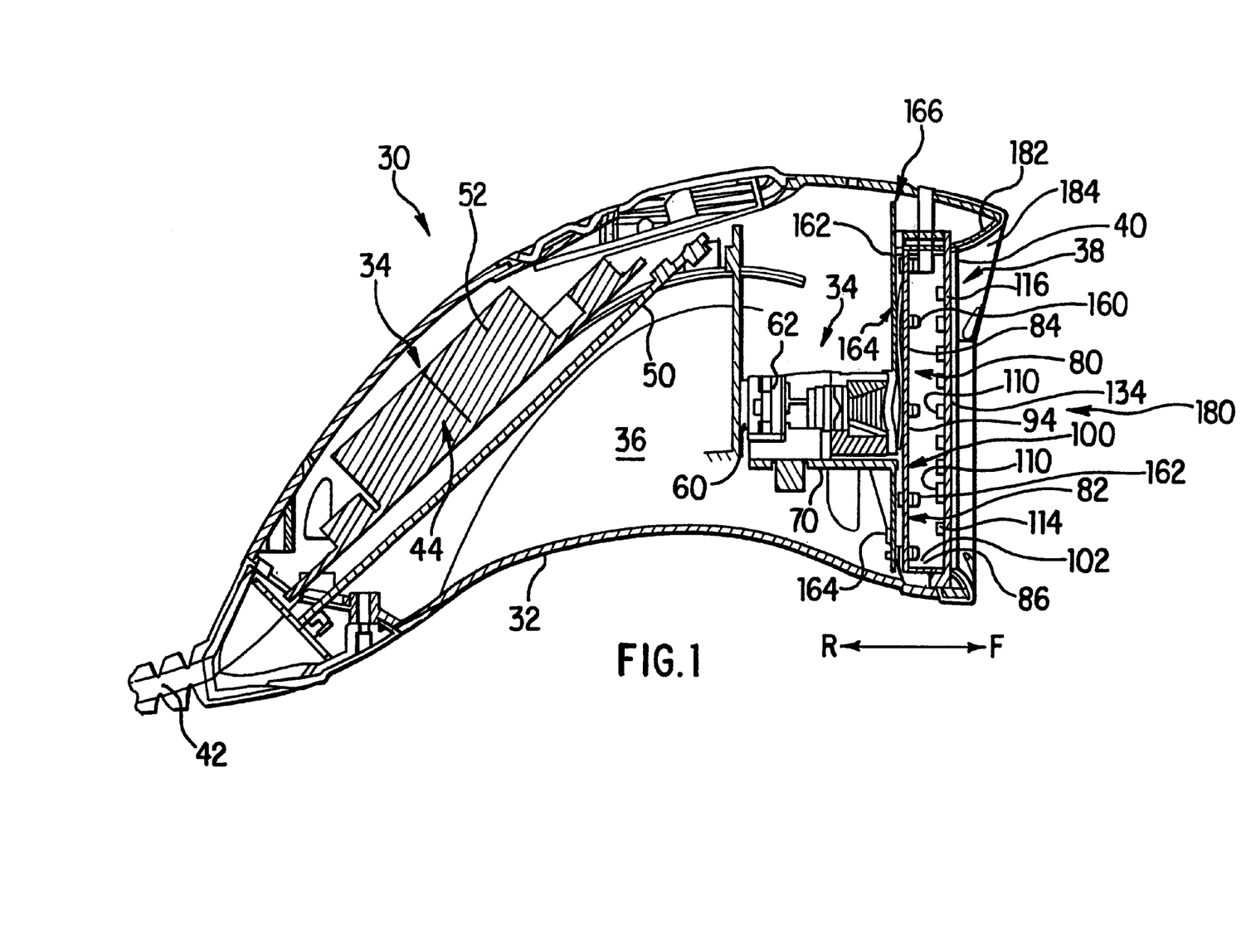
FIG. 1 is a schematic side elevation view, in partial section, of a hand-held imager for incorporating illumination apparatus and utilizing methods incorporating the instant invention.
Figure 2:
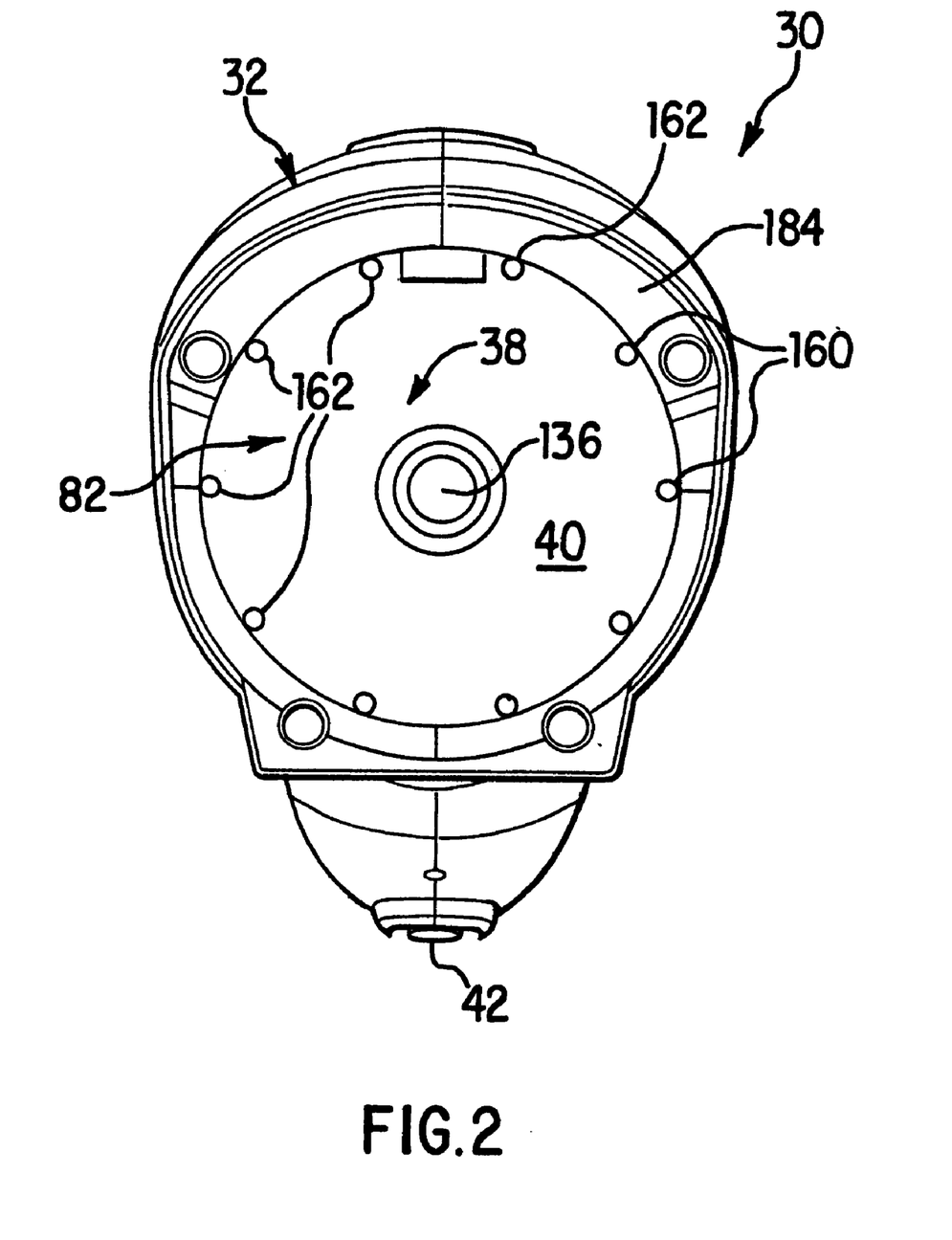
FIG. 2 is a schematic front elevation view of the imager of FIG. 1.
Figure 3:
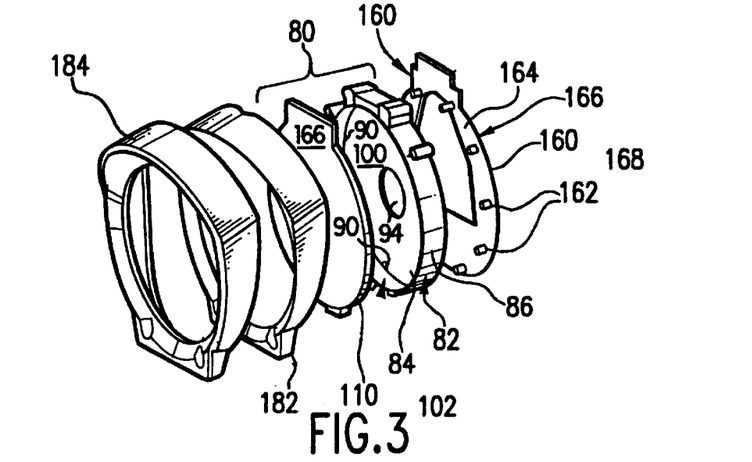
FIG. 3 is a perspective schematic of the illumination assembly of the imager of FIGS. 1 and 2 with front cover and bezel, exploded to better show details thereof.

With reference to FIGS. 1 and 2, there is generally shown at 30 an imager or imaging device of the type which electronically captures images of symbology, such as that of bar codes, stacked bar codes and 2-D (dimensional) codes or symbols, and converts the captured image into decoded electronic signals with decoded values passed out to a data gathering apparatus. Such signals may be thereafter decoded and further processed and/or utilized within the imager and/or transmitted to signal processing apparatus for decoding, storage and/or use for accounting, inventory, material handling, manufacturing processes or the like and/ or such further processing may be accomplished in whole or in part within imager 30 or such processing apparatus. While a housing 32 for imager 30 has been configured and constructed as one for a hand-held imager it may just as well be mounted for stationary use or it may be otherwise constructed and configured so that the components and assemblies therewithin are mounted within a stationary housing. Housing 32 is constructed and configured to mount and enclose imaging components 34 within a space 36 having an opening 38 that is closed, in whole or in part, by a window 40. An electrical conduit 42 extends from an electronic package 44 (FIG. 1), through housing 32 for interconnection with signal processing apparatus when signal processing and decoding is not accomplished by package 44 and with associated apparatus for supplying input power and control and other electronic signals to imager 30 when and if required. It is also quite possible to construct imager 30 to be battery powered without conduit 42 so that the signals generated therewithin from the captured images, and signals to be received by imager 30, are otherwise transmitted, as by radio frequency, between storage and utilization apparatus and imager 30.

Electronic package 44, mounted within housing 32 by suitable and conventional components, in turn mounts and includes by way of example, a CPU board 50 and a power board 52, as well as other associated components, connectors, printed circuits and electrical connections. Electronic package 44 may be otherwise mounted within housing 30 and may include additional and/or other components for generating appropriate output signals depending upon the signals received from an image receiving device 60 (FIG. 1) and/or otherwise processed within imager 30. Image receiving device 60 includes a CCD (charge coupled device), but may instead utilize a CMOS (complimentary metal oxide semi-conductor) or similar device for receiving an image from symbology carried by an article. A suitable filter or filter package 62 is positioned proximate image receiving device 60 and together with device 60, and other components (lenses, etc.), provide a camera engine 70 for imager 30. Camera engine 70 is mounted within housing 32 and is positioned therein to receive an image of symbology for further processing within imager 30.

It is most important that imaging device 30 receive the best defined image possible. To accomplish that it is extremely important that the symbology to be imaged not only be in focus for imaging device 30 but also that illumination for and of the symbology be uniform and preferably diffuse over the entire area of the symbology. Camera engine 70 is configured and constructed, and includes appropriate and conventional lenses, to accomplish focusing of the symbology onto image receiving device 60. An illumination assembly 80 is mounted within housing 30 proximate window 40 thereof to illuminate the symbology to be imaged.

Illumination device 80 (FIG. 1) includes an illuminator 82 (FIGS. 1–5) which is substantially cup or bowl shaped in configuration and includes a base 84 (FIGS. 1, 3, 4 and 5) and a perimeter wall 86 extending at right angle to base 84 for a predetermined distance "x" (FIG. 4) to terminate at a perimeter edge 88. A plurality of first openings 90 (FIGS. 4 and 5) extend through base 84 proximate wall 86. While nine such openings 90 are shown more or less openings may be utilized. A central opening 94, which extends through base 84 at the center thereof, is preferably concentric with perimeter wall 86. When assembled within housing 32 of imager 30 central opening 94 of illuminator 82 is aligned with the optical lenses of camera engine 70 to permit the illuminated symbology image to be cast upon image receiving device 60.

An inner surface 100 of base 84 of illuminator 80 and an inner surface 102 of perimeter wall 86 thereof are finished in either smooth red or white, rough chrome, matte finish white or in any other manner so that an approximately lambertian, or substantially lambertian, output illumination pattern is effected and projected out from every point on the respective surfaces 100, 102 that are illuminated, as will be hereinafter explained.

While perimeter wall 86 is shown and described as extending from base 84 at a 90 degree angle it should be understood that perimeter wall 86 may just as well meet base 84 at other suitable angles and that illuminator 82 may alternatively be formed with a dish-like shape wherein the base and side wall curve into one another with a selected slope such as one might find in a parabolic dish.

Figures 4, 5, 6, 7, 8:
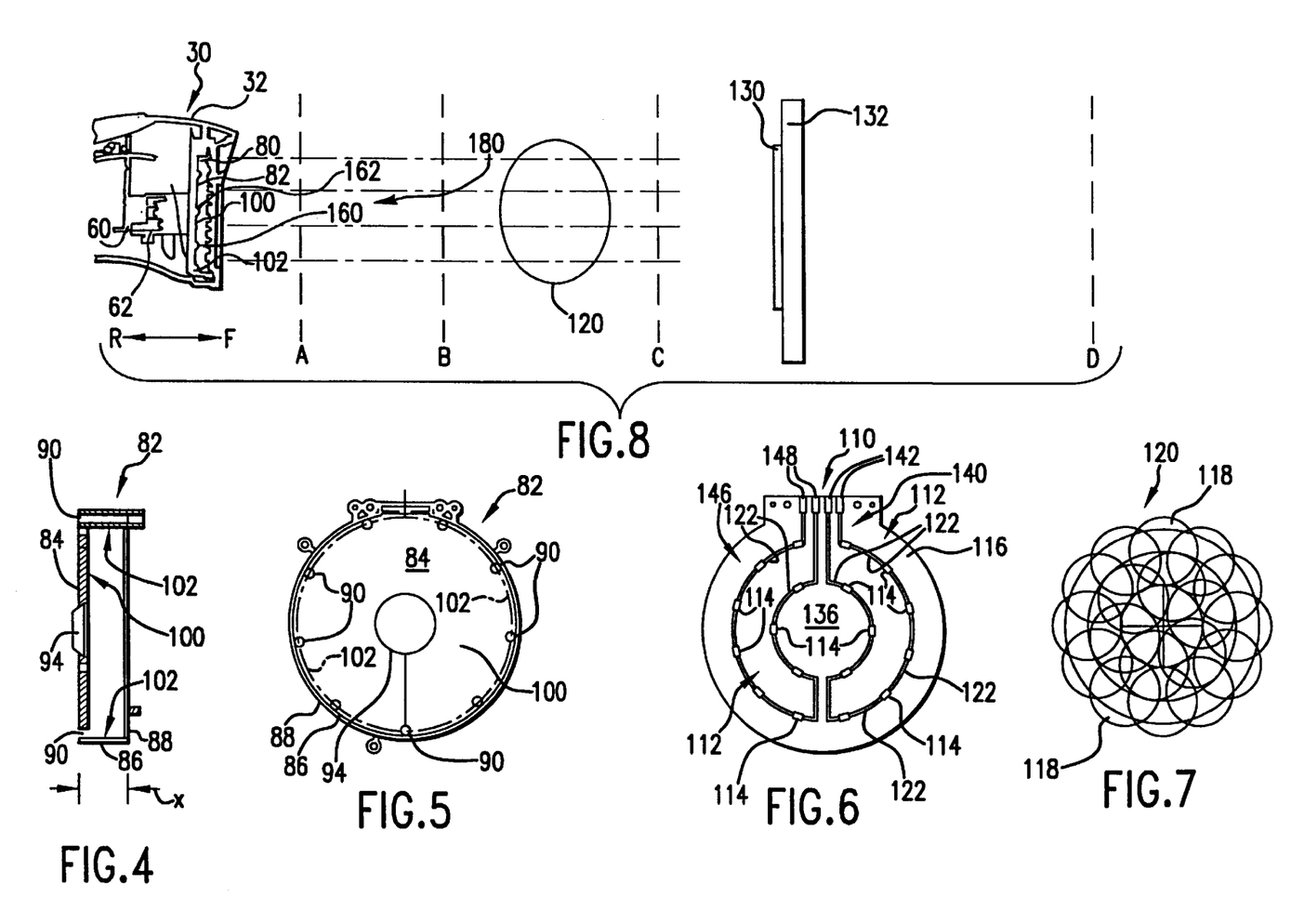
FIG. 4 is a side elevation sectional view of the illuminator of the illumination assembly for the imager of FIGS. 1 and 2, with the illumination source removed to better show details thereof.
FIG. 5 is a front elevation view of the illuminator of FIGS. 1, 3 and 4.
FIG. 6 is a plan view of the illumination source for the illuminator of FIGS. 1, 3, 4 and 5 for the hand-held imager of FIGS. 1 and 2.
FIG. 7 is a schematic diagram showing the distribution of illumination upon and emanating from the illuminator of FIGS. 1, 3, 4 and 5.
FIG. 8 is a schematic of the illuminator and illumination source of FIGS. 1–7 disposed in relationship to a target.
Figure 9:
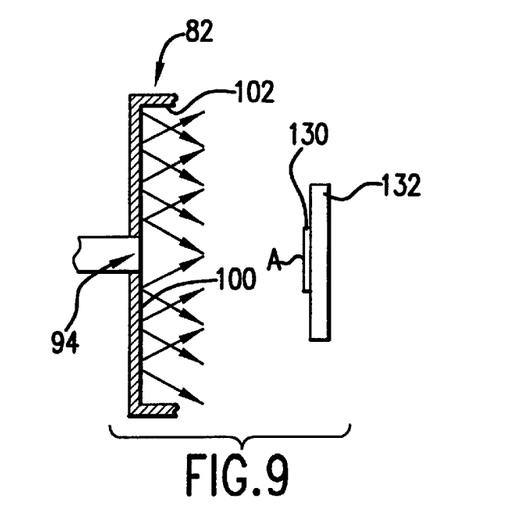
FIG. 9 is a schematic showing of the illumination from the illuminator of FIGS. 1 and 3–5 in relationship to a symbology target.
Figure 10:
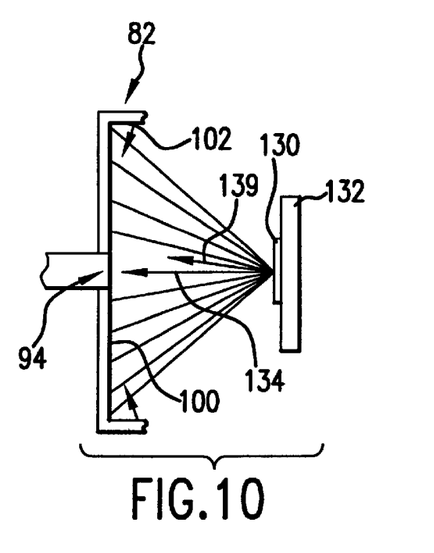
FIG. 10 is a schematic further showing the illumination from the illuminator of FIGS. 1, 3–5 and 8 in relationship to a symbology target.

An illumination source 110 (FIGS. 1, 3 and 6) is provided to cast illumination towards and upon surfaces 100 and 102 respectively of illuminator 82. An array 112 (FIGS. 1 and 6) of illumination devices, such as surface mounted unlensed light emitting diodes (LED's) 114, are mounted to an illumination carrier 116 (FIGS. 1, 3 and 6) which is, in turn, secured in place within housing 32 and against beveled peripheral edge 88 of illuminator 82 by conventional means and as shown in FIGS. 1 and 8. LED's 114 are secured to carrier 116 and positioned thereon in array 112 so that each LED 114 of array 112, when illuminated, will cast substantially lambertian or focused illumination, upon surfaces 100, 102 of illuminator 82. The illumination 118 (FIG. 7) so cast by each LED 114 (FIGS. 1, 6 and 8) will effect an approximately lambertian output illumination pattern ( maximum energy is cast forward, on axis, and decreasing amounts of energy are cast in increasingly off axis directions) and will overlap illumination 118 of adjacent LED's 114 as shown in FIG. 7; except for a central space 119 so that illumination does not shine into the lenses of camera engine 70. Illumination 118 from LED's 114 which strike surface 102 of perimeter wall 86 will be directed back into illuminator 82 and against surface 100 of base 84 to further enhance and add efficiency to illumination 118. Surfaces 102 may be covered with retroreflective material, such as reflective material used for reflective traffic signs and license plates and manufactured by 3M, to enhance the amount of light that is returned to surface 100. All the various illumination components 118 together will provide an area of illumination 120 (FIG. 7) which is projected from illuminator 82 and illumination device 80 towards and upon symbology to be imaged, such as a target 130 (FIGS. 8, 9 and 10). Target 130 is carried by a surface 132 which may be the wall of a package or an outer surface of a part, component, subassembly, or assembly.

Illumination carrier 116 (FIGS. 3 and 6) may have its surface coated in selected areas with transparent conductive material to electrically interconnect unlensed LED's 114, or LED's 114 may otherwise be electrically interconnected by relatively thin lines of conductive ink or wire 122 (FIG. 6). LED's 114 and any electrical conductors 122 utilized to interconnect LED's 114 into an electrical circuit are selected to be small enough so that any shadow of same that might appear on symbology 130 (FIGS. 8–10) will be out of focus when imager 30 is in focus with respect to a particular target 130. Thus any shadow image of any such wires 122 and LED's 114 will be "smeared" out and not affect the image of target 130 that is cast upon image receiving device 60.

Figure 11:
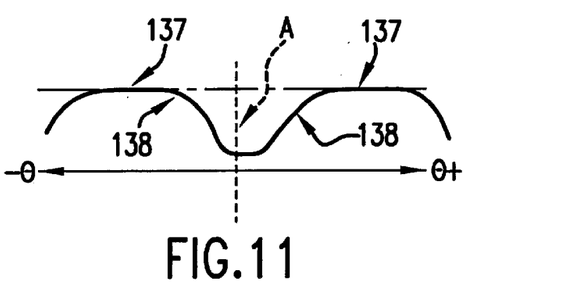
FIG. 11 is a diagrammatic showing of an illumination curve for "dark field" illumination from the illuminator of FIGS. 1 and 3–5.

The illumination system of the instant invention corrects this situation by providing a light source that provides a known and relatively constant illumination over a wide range of angles when illuminating close up (1.5 inches to 4 inches) symbologies. The principle of the illumination is shown in FIGS. 9, 10 and 11.

Diffuse illumination projected from illuminator surfaces 100, 102, will evenly illuminate "substantially all points" on symbology 130 (FIGS. 8–10) over a wide range of angles. Such illumination is useful both when illuminating specular and matte surfaces. When the relationship is as shown in FIG. 10 with the object 130 perpendicular to the camera axis none of the light rays from the illuminator that strike surface 130 will enter the camera lens if the surface is specular. It can be seen that light from any point on the illuminator surface 100 or 102 will bounce off of the mirror like surface and miss the lens. This occurs because the angle of reflection will always equal the angle of incidence and so direct light leaving any portion of the illuminator 100 or 102 back onto the symmetrically opposite portion of the illuminator. Of course, if the surface 130 were matte, the light impinging on surface 130 would be re-radiated over a wide range of angles and so light energy would enter the camera lens. A map showing the rough distribution of light being received at a central point A on surface 130, versus angle of arrival is shown in FIG. 11. Note that the distribution is smooth over a wide angle except for a null, B in FIG. 11, corresponding to the fact that little or no light is emitted from the region of the central hole 94. The arrangement shown in FIG. 10 is ideal for imaging a specular part that has a matte symbology located on it. In this arrangement, the specular background will appear to be "black" and the "one" regions of the symbology, which may for instance be formed by data cells painted matte white will stand out as bright against the dark background. The matte "one" data cells may also be made of any other irregularity or disturbance of the specular surface (which reflects light over a wide range of angles) as may be formed by laser marking or peening with a tool. Of course, the codes may also be formed by marking so that the disturbed or "bright" areas are considered to be a "zero" and the black background formed by the specular surface may be considered to be the "ones". The foregoing illumination setup is known as "dark field" illumination because the specular background appears to be dark.

If a specular surface such as 130 in FIG. 10 is tilted slightly, in any direction from the position shown, say about 10 degrees, light from portions of the illuminator surfaces 100 and 102 will now be reflected directly into the camera lens so that the surface 130 will appear to be bright to the imager. The surface brightness as seen by the camera will appear to be approximately equal to the brightness of the illuminator. Any matte markings on the surface caused by a dark paint or peening or laser marking will now appear to be "dark" compared to the background. This will occur because the light directly reflected from the specular surface 130 will appear to be much brighter than the light that is scattered (only a small portion entering the camera lens) from the disturbance that may be used to define either a "one" or a "zero" portion of a symbology. When used off axis the illuminator provides a "bright field" illumination because the specular surface background appears to be brighter than the objects contained within.

It should be noted that the disposition of illumination carrier 116 positions array 112 of LED's 114 relatively close to illuminator base 84 thus allowing for a relatively thinner illumination component for imager 30 and a relatively more compact and efficient imager 30, then the prior art devices which utilize diffusers.

LED's 114 are selected to provide illumination in appropriate color and with an illumination potential appropriate for the targets to be illuminated by imager 30. To facilitate the approximately lambertian and wide range output of LED's 114 only unlensed LED's are utilized. The usual light reflector's, and covers provided for most LED's are not required for illumination source 110. LED's 114 are arranged on carrier 116 with twelve LED's 114 in an outer circle and six LED's 114 in an inner circle. A first circuit 140 (FIG. 6) of nine LED's 114 (six from the outer circle and three from the inner circle) and conductors 122 terminates at connectors 142; while a second similar circuit 146 of nine LED's 114 and conductors 122 terminates at connectors 148. Circuits 140 and 146 may be activated separately, together or in sequence as described from suitable appropriate and conventional sources. Such illumination circuits may also be energized at various selected intensities and for selected time intervals to provide a desired brightness level and duration of illumination.

Illuminator 82 and illumination source 110 provide a "dark field" illumination device 80 for imager 30. Targets in a range up to approximately four (4) inches from imager 30 (specifically 1.5 inches to 4 inches; i.e. from "A" to "B"—FIG. 8) are considered to be in a "dark field" and best illuminated by diffuse illumination device 80. Illumination device 80 may also be utilized for targets in a mid-range (i.e. between "B" and "C" of FIG. 8); but illumination from device 80 when utilized for the mid-range may be supplemented by or replaced with, illumination from a "bright field" illumination device 160 (FIGS. 1–3 and 8) to be hereinafter described in greater detail. Targets disposed at distances greater than 8 inches (from "C" towards "D"—FIG. 8) are usually sufficiently illuminated by "bright field" illumination device 160; however, "dark field" illumination device 80 may still be utilized if additional illumination is required.

A plurality of "bright field" illumination devices 162 (FIGS. 1–3 and 8), which preferably comprise conventional lensed LED's, are carried by a "bright field" illumination carrier 164 and together therewith comprise a "bright field" illumination source 166. LED's 162 extend out from their carrier 164 and are disposed in a circle proximate the periphery of carrier 164 and through openings 90 (FIG. 4) of illuminator 82. An enlarged opening 168 (FIG. 3) is formed through carrier 164 and positioned so that when carrier 164 is disposed within housing 32 the optics of camera engine 70, and image receiving device 60, will be aligned with, and have an unobstructed disposition with respect to, central opening 94 of illuminator 82, and central area 136 (FIGS. 2 and 6) of "dark field" illumination carrier 116. Suitable, conventional and appropriate electrical conductors (not shown) are provided to carrier 164 and LED's 162 and interconnect LED's 162 to an appropriate source of electrical power and controls so that the brightness level and duration of illumination of LED's 162 may be suitably and selectively controlled. The nine LED's 162 shown for bright field illumination device 160 are exemplary and either less or more LED's 162 may be utilized. Alternatively other suitable and appropriate illumination devices may be utilized in place of LED's 162 for bright field illumination device 160.

"Bright field" illumination device 160 and "dark field" illumination device 80 are respectively assembled into housing 32 and secured in position within housing 32 between camera engine 70 and window 40 of housing 32. The disposition of devices 160 and 80 within housing 32 is such as to establish a line of sight 180 (FIGS. 1 and 8) from target 130 (FIG. 8) through a central area of window 40, dark field carrier 116, central opening 94 of illuminator 82, the lenses of camera engine 70 and onto CCD image receiving device 60. Since "dark field" illumination carrier 116 is transparent and may serve to protect mechanisms within housing 32 from the entry thereinto of dirt, dust, liquid and other unacceptable matter window 40 may either comprise just an opening or a transparent cover of glass, plastic or the like. A bezel 182 (FIGS. 1 and 3) and a front cover 184 (FIGS. 1–3) close off the front of housing 32.

When "bright field" illumination device 160 is properly installed within housing 32 LED illumination devices 162 are disposed to direct their illumination forward (in the direction of arrow F—FIGS. 1 and 8) of housing 32 as explained in greater detail earlier in the description. When "dark field" illumination device 80 is properly installed within housing 32 LED illumination devices 114 are disposed to direct their illumination rearward (in the direction of arrow R—FIGS. 1 and 8) of housing 32 as explained in greater detail earlier in this description.

Figure 12:
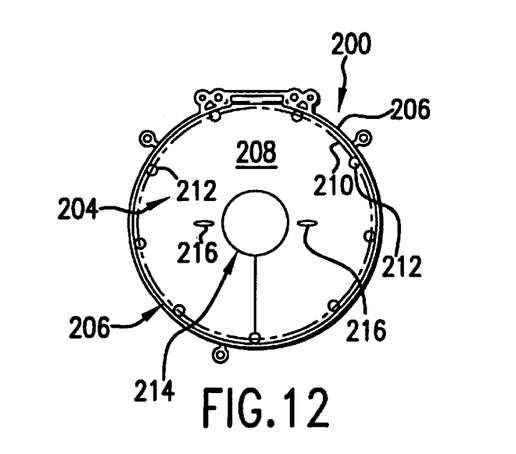
FIG. 12 is a front elevation view of an alternate embodiment of illuminator for the imager of FIGS. 1 and 2.
Figure 13:
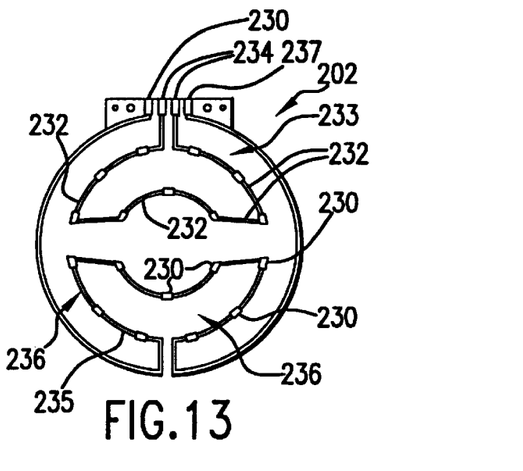
FIG. 13 a plan view of an alternate embodiment of illumination source for the imager of FIGS. 1 and 2.

An alternative embodiment and construction of an illuminator 200 is shown in FIG. 12 and an illumination source 202 for cooperation with illuminator 200 is shown in FIG. 13. Illuminator 200 is also dish shaped (like illuminator 82 of FIG. 4) and includes a base 204 (FIG. 12) and side walls 206 with surfaces 208, 210 respectively that are finished like surfaces 100, 102 of illuminator 82 described earlier in this description. Illuminator 200 also includes openings 212, sized, disposed and for the same purpose as openings 90 of illuminator 82 (i.e. for "bright field" illumination LED's (not shown). A central opening 214, provided through base 204 of illuminator 200, is positioned the same as and for the same purpose as central opening 94 of illuminator 82. Elongated openings 216 are aligned with and provide openings for spotter or locating beams (not shown) which may, for example, comprise sources of laser illumination (not shown) which, when activated, generate a user observable spotter line across target 130. When the observable spotter line is not only on target but is also substantially the width of target 130 it indicates to the user of imager 30 that they are within the field of view for imager 30 and can continue operation of imager 30 to focus on and image target 130.

A plurality of unlensed LED's 230, carried by an illumination carrier 231, are provided as illumination devices for illumination source 202. Electrical conductors such as conductive strips, ink or wires 232 interconnect LED's 230 into either a first circuit 233 which terminates at connectors 234; while similar electrical conductors 235 interconnect LED's 230 into a second circuit 236 which terminates at connectors 237. Illumination source 202, carrier 231, LED's 230 and wires 232,235 are assembled and function as described for illumination source 110, carrier 116, LED's 114 and conductive wires 122 of illumination source 110 (FIGS. 1–8). Illumination source 202 furthermore is to be disposed proximate illuminator 200 and to cooperate therewith to provide highly diffuse light as described above for illumination device 80 (FIGS. 1–8).

Figure 14:
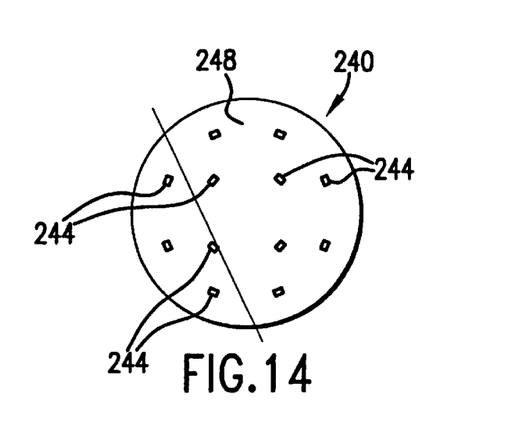
FIG. 14 is a schematic plan view of an alternative embodiment illumination source for the imager of FIGS. 1 and 2.
Figure 15:
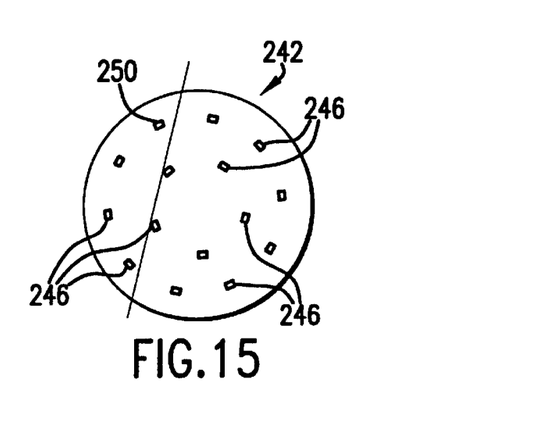
FIG. 15 is yet another plan view of an alternative embodiment illumination source for the imager of FIGS. 1 and 2.

FIGS. 14 and 15 show alternative illumination sources 240, 242 for an imager such as imager 30 and which incorporate the instant invention. Illumination sources 240, 242 are sized and configured for co-action with an illuminator such as illuminator 80 of the embodiment of FIGS. 1–8 or the illuminator 200 of the embodiment of FIG. 12. Each illumination source 240, 242 includes a plurality of illumination devices 244, 246 respectively, which preferably are unlensed LED's such as unlensed LED's 114 (FIG. 6) and unlensed LED's 230 (FIG. 10). Carriers 248, 250 respectively are fabricated from clear and transmissive (to the emitted LED wavelengths) material such as glass, plastic, etc., and may either be provided with electrically conductive but transparent conductors to unlensed LED's 244, 246 respectively or suitably conductive but relatively thin electrical conductors such as those shown and described at 122 (FIG. 6) and 232 (FIG. 13). Such conductors for LED's 244, 246 are also electrically connected to a source of electric power and to a suitable control to arrange LED's 244, 246 in either a single or plural selected circuits and to control the brightness and duration of illumination from sources 240, 242. The differences between illumination sources 240, 242 are that source 240 includes eight LED's 244 in an outer circle and four LED's in an inner circle; while source 242 includes ten LED's 246 in an outer circle and five LED's 246 in an inner circle. The illumination patterns provided by cooperation of illumination sources 240 and 242 with illuminators such as 82 (FIGS. 4 and 5) and 200 (FIG. 12) will be approximately or substantially lambertian and overlapping such as that shown in FIG. 7 and will provide diffuse target illumination such as 120 of the embodiment of FIGS. 1–8.

In all of the embodiments of the illumination device it should be understood that although the color of the LED light sources has been referred to as "red" the illumination device could have been equally well manufactured using LED's of yellow, green or other color light output if the reflecting surface of the illuminator are white, chromed or of the same color as the LED source.

Imaging device 30 (FIGS. 1–8), as described hereinabove, provides an illumination pattern for illumination of those symbology data cells which become located within a "dark field" as seen by camera engine 70. The data cells making up a particular encoded symbol may be a combination of black and white data cells or a combination of data cells of other pairs of contrasting colors. A successful decode of such symbology is more easily achieved if image receiving device 60 (FIGS. 1 and 8) receives reflections of the symbology data cells, illuminated by imager 30, of the highest possible contrast.

Figure 16:
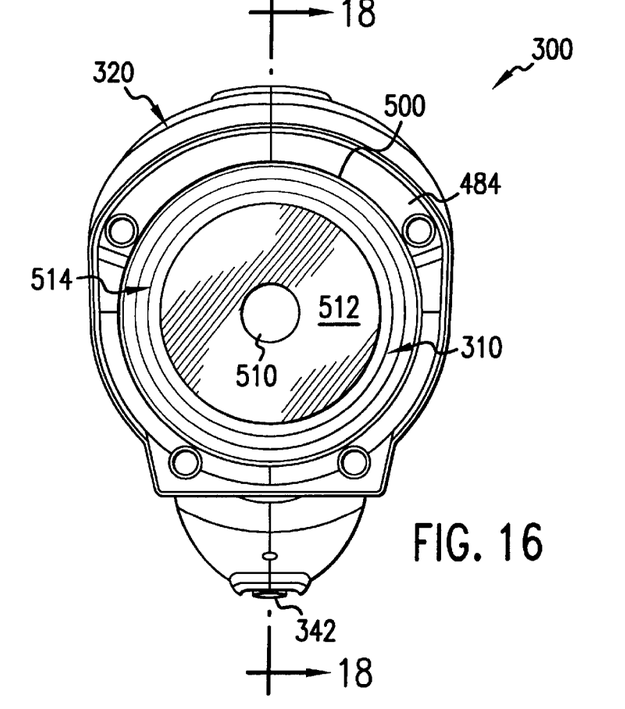
FIG. 16 is a schematic front elevation view of a hand-held imager, similar to the imagers of FIGS. 1–15, and fitted with an illumination re-directing attachment incorporating the instant invention.
Figure 17:
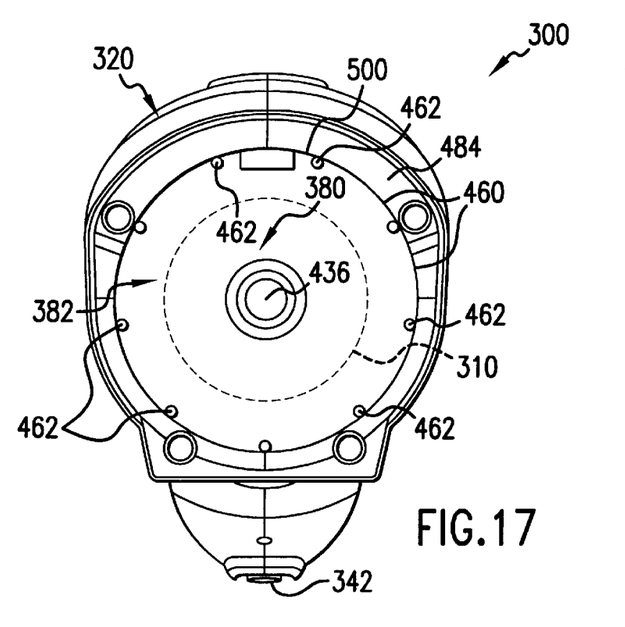
FIG. 17 is a schematic front elevation view of the hand-held imager of FIG. 16 with the illumination re-directing attachment of FIG. 15 in phantom to better show details of the imager.
Figure 18:
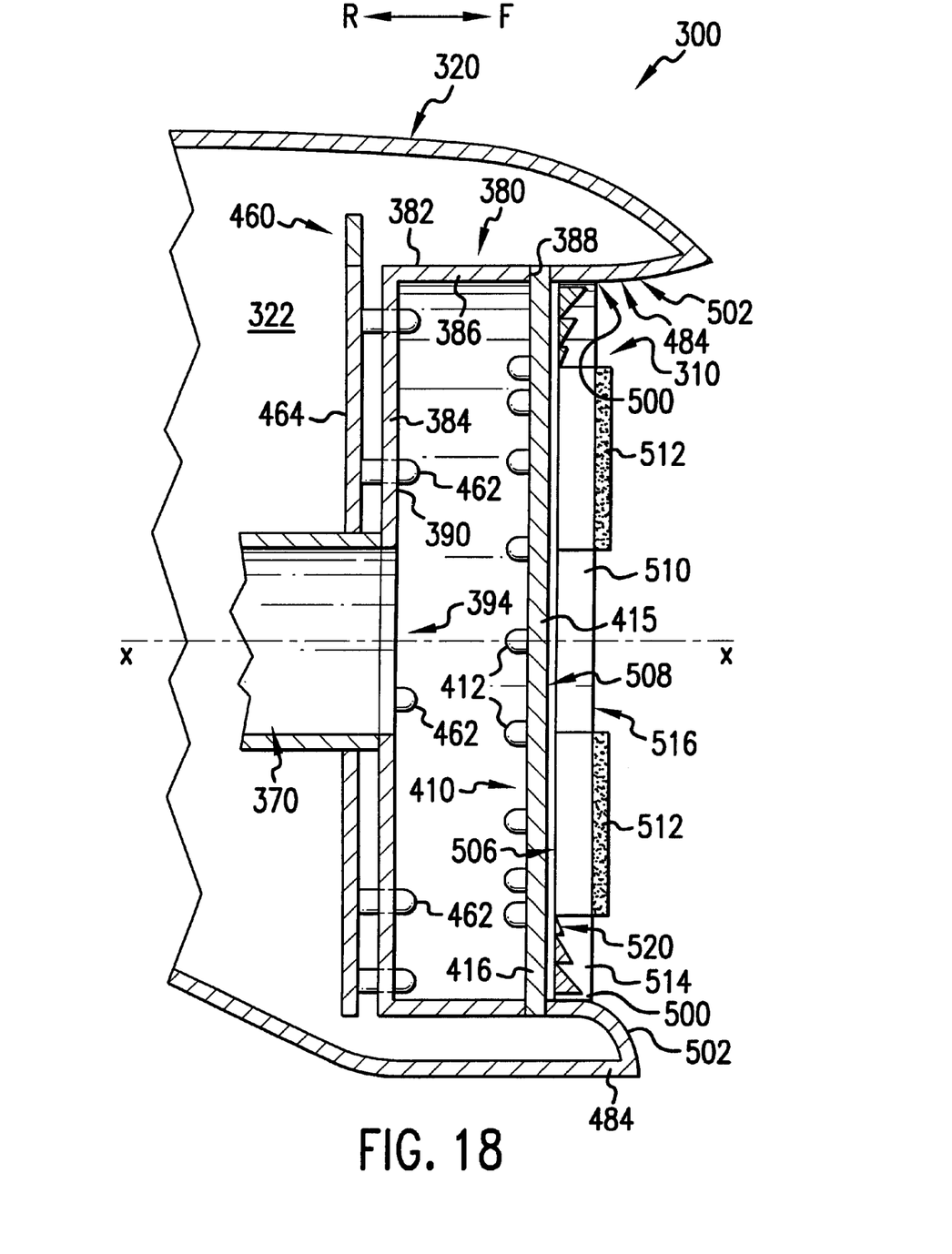
FIG. 18 is a partial elevation section on lines 18—18 of FIG. 16.

FIGS. 16–18 show an imager 300, which is identical to imager 30 of the embodiment of FIGS. 1–8, but which includes a "dark field" illumination enhancing and directing attachment, or device, 310 which incorporates the instant invention. Imager 300, like imager 30, includes a housing 320 encasing imaging components within a space 322 (FIG. 18) within housing 310.

The imaging components for imager 300 include a camera engine 370, a "dark field" illumination device 380 and a "bright field" illumination device 460 respectively identical in construction, disposition within housing 320, and operation, to camera engine 70, "dark field" illumination device 80 and "bright field" illumination device 160 of the embodiment of FIGS. 1–8. The respective "bright field" illumination devices and "dark field" illumination devices provide "bright field", illumination patterns and "dark field" illumination patterns respectively. Imager 300 also includes an image receiving device (not shown) and is provided with an electronic package (not shown) that are also identical in construction, disposition within housing 320 and operation respectively to image receiving device 60 and electronic package 44 of the embodiment of FIGS. 1–8.

"Dark field" illumination device 380 (FIG. 18), like illumination device 80, includes a disk shaped illuminator 382 with a base 384, and perimeter wall 386 terminating at a peripheral edge 388. A central opening 394 extends through base 384 and is aligned with optical lenses (not shown) of the camera engine. An illumination source 410, for illumination device 380 includes an array 412 of light emitting diodes 414 disposed upon an illumination carrier 416 positioned against peripheral edge 388 of illuminator 382. The type of diodes 414 selected, the configuration of array 412, the electrical interconnection and powering of diodes 414 and their interaction with illuminators 382 is as described above for previously described embodiments. It is important to note that diodes 414 of array 412 are not disposed within a central portion 415 of carrier 416 aligned with central opening 394 that is aligned with the camera engine and image receiving device.

"Bright field" illumination device 460 (FIGS. 17 and 18), like illumination device 160, includes a plurality of light emitting diodes 462 disposed about the periphery of a carrier 464. In this particular embodiment nine LED's 462 are disposed in a circle at 40 degree arcuate spacings proximate the periphery of carrier 464 (FIG. 17). When carrier 464 is disposed proximate an outer surface of base 384 of illuminator 382 (FIG. 18) each LED 462 extends through an opening 390 formed through base 384 in a circle corresponding to and aligned with the circular disposition of LED's 462 on carrier 464. LED's 462 are connected in an electrical circuit and function as described hereinabove for the "bright field" illumination devices of the embodiments of FIGS. 1–15. A window, such as window 40 of the embodiment of FIGS. 1–8, is not provided for imager 300 but may be so provided if desired.

Illumination enhancing and directing attachment 310 is shown in position in imager 300 in FIG. 16, in position and in vertical section in FIG. 18 and in phantom in FIG. 17. Attachment 310 is disc-like in configuration with its outer peripheral edge 500 sized and configured for a snap fit with a peripheral lip 502 (FIG. 18) of a front cover 484 of housing 320. A rear surface 506 of attachment 310 is disposed proximate a face surface 508 of LED carrier 416 when snap fit in place in housing 320.

Illumination attachment 310 includes a central opening 510, disposed to be in alignment with central opening 394 and the camera engine and image receiving device, an optional inner annular shaped mask 512 and an outer annular ring 514. Mask 512 comprises a layer of black material of annular configuration affixed to a face surface 516 of attachment 310. The black material selected is impervious to the passage of light therethrough and non-reflective. The mask 512 may be made "snap-out" removable from attachment 310 and in certain applications when the highest imaging contrast is not needed it may be omitted entirely or replaced with a transparent element or a large opening. Outer annular ring 514 is formed as a fresnel 520 with its fresnel surface facing face surface 508 of LED carrier 416. The configuration of fresnel surface 520 is such that when illumination impinges thereupon the illumination will be directed forward (in the direction of arrow F, FIG. 18) and towards a center line x—x passing through the center of central opening 510. Outer annular ring 514 is disposed in alignment with the circle of LED's 462.

The snap fit of attachment 310 within cover 484 of housing 320 is such as to permit ready insertion and removal of attachment 310. Attachment 310 may be permanently installed within cover 484 if so desired. In addition mask 512 may be provided as a separate structure or by constructing the respective annular portion of attachment 310 of appropriately non-reflective colored material impervious to the passage of light therethrough.

While the fresnel configuration of outer annular ring 514 is shown to completely encircle annular ring 514, it may also be formed with arcuate fresnel segments corresponding to the respective positions of LED's 462 and with arcuate clear segments disposed between the fresnel segments. Such an attachment 310 would be fitted within cover 484 (as shown in FIGS. 16–18) but so as to be rotatable between a first disposition wherein the fresnel segments are aligned with LED's 462 to direct illumination as hereinabove described and a second disposition wherein the clear segments are aligned with LED's 462 permitting their illumination to be directed as "bright field" as described hereinabove for LED's 162 of the embodiment of FIGS. 1–8. Also, with the mask 52 removed or not initially present, energizing LED's 412 allow the "dark field" illumination modes of FIGS. 8–11 to be achieved without removing attachment 310. The attachment so configured with arcuate fresnel segments could, if so desired, be permanently installed in the position of FIGS. 16–18 within housing 320 but so as to permit the aforedescribed first and second dispositions thereof.

Imager 300, without attachment 310 functions as described above for imager 30 of FIGS. 1–8. When the contrast of the symbology cells being imaged for decoding is not optimized to provide a successful decode for cells located in a "dark field" illumination enhancing and directing attachment 310 may be snap fit into position as shown in FIGS. 16–18. If outer annular ring 514 includes arcuate fresnel segments they are to be aligned with LED's 462. If the entire surface of outer annular ring 514 is provided with the fresnel configuration no such alignment is necessary.

When LED's 462 are activated as described hereinabove for LED's 162, instead of providing "bright field" illumination (as described for imager 30 of the embodiment of FIGS. 1–8) their respective illumination will be directed by the fresnel surface forward (in the direction of arrow F—FIG. 18) and towards center line x—x to provide an enhanced "dark field" illumination that serves to maximize the contrast between the symbol cells and thus provide for an image upon the image receiving device that will provide a successful decode.

LED's 412, if utilized, cast their illumination upon the inner surface of base 384 and peripheral walls 386 of illumination 380 and would, except for the disposition of mask 512, and its being impervious to light, provide a diffuse illumination of the targeted symbology. As such when attachment 310 is in place the power of LED's 412 may be cut-off and therefore no illumination will be provided by LED's 412. If desired power to LED's 412 may remain on and that portion of the diffuse illumination provided by LED's 412 which reaches outer annular ring 514 will also be directed by the fresnel surface towards the symbology as described hereinabove.

Figure 19:
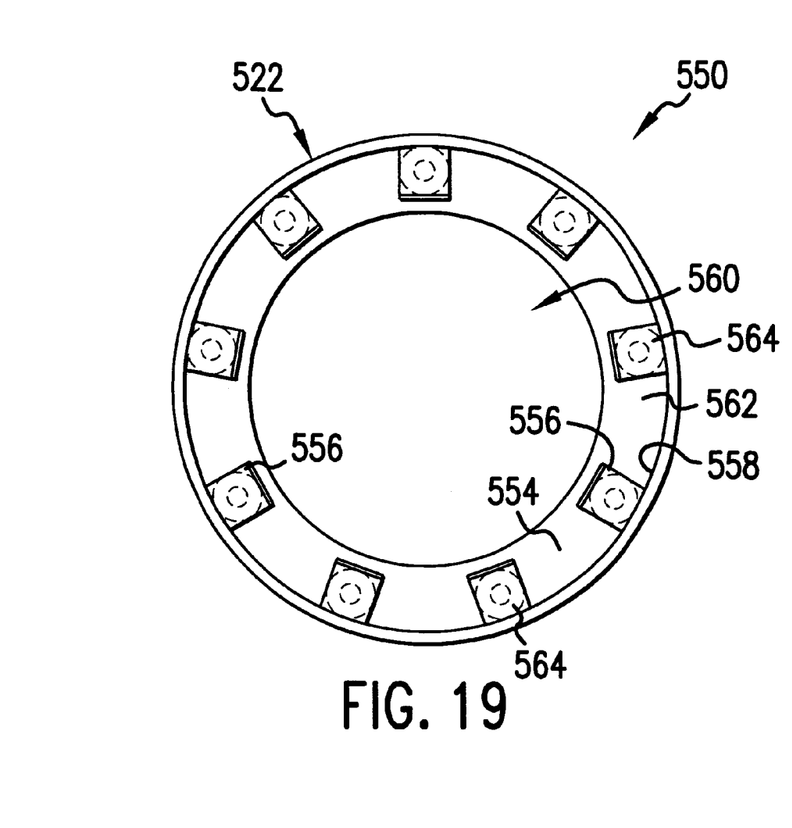
FIG. 19 is a schematic front elevation of an alternative embodiment of illumination re-directing attachment incorporating the instant invention.
Figure 20:
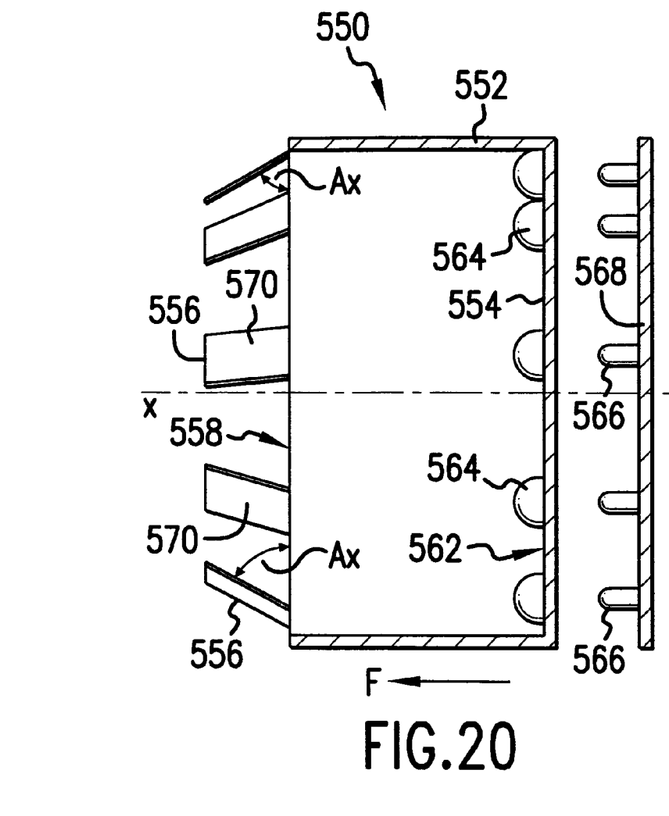
FIG. 20 is a vertical elevation along line 20—20 of FIG. 19 with parts exploded to better show details thereof.

An alternative embodiment of illumination enhancing and directing attachment 550 incorporating the instant invention, is shown in FIGS. 19 and 20. Attachment 550 is also configured and sized to be fitted within cover 484 (FIG. 18) of imager 300 (or cover 184 of imager 30 of FIGS. 1–8). Attachment 550 includes: a cylindrical body 552, (of clear plastic or other suitable material, clear or otherwise), with an annular base 554, a plurality of flap-like, reflective illumination directors 556, disposed about an edge 558 of body 552, and a relatively large central opening 560.

Secured to an inner surface 562 of an annular base 554 are a plurality of collimating lenses 564 their being one such lens 564 for each LED 566 carried by a carrier 568. LED's 566 and carrier 568 correspond to LED's 162 and carrier 164 of the embodiment of FIGS. 1–8 and would, except for the disposition of attachment 550, function as described hereinabove for LED's 162.

The number of illumination directing flaps 556 correspond to the number of lenses 564 and LED's 566. The disposition and positioning of directors 556 corresponds to the positioning of lenses 564 so that an inner surface 570 of each such flap-like director receives illumination from its aligned LED 566. Each such inner surface 570 has a reflective mirror finish and each such flap-like director is disposed at a selected angle "x" (FIG. 20) with respect to peripheral edge 558 of body 552. Angle "x" is selected so that illumination striking from LED's 566 upon passing through collimating lenses 564 will impinge upon reflective surface 570 and be directed forward (in the direction of arrow F, FIG. 20) and towards a center line x—x passing through body 552. Angle "x" may, for example, be 60 degrees, but other suitable and appropriate angles may be utilized.

Attachment 550 is sized and configured to be rotatively mounted within cover 184 of imager 30 (or cover 484 of imager 300) and so as to disposed proximate carrier 116 for LED's 114 (or carrier 416 for LED's 414 of the embodiment of FIGS. 16–18). When attachment 550 is rotated to a disposition with flap-like illumination directors 556 in alignment with LED's 566 it will function to direct the illumination as described in the preceding paragraph and thus to optimize "dark field" illumination as described hereinabove. When attachment 550 is rotated to a disposition with its flaps 556 not aligned with LED's 566 the LED's will function as "bright field" illumination devices as described hereinabove for LED's 162 of imager 30.

Central opening 560 of attachment 550 permits "dark field" diffuse illumination from illumination device 80 of the embodiment of FIGS. 1 to 8 as described hereinabove for that embodiment. It is also possible to disconnect the power to illumination device 80 when attachment 550 is disposed to direct illumination from LED's 566 towards the symbology depending upon which arrangement of illumination will provide optimum "dark field" illumination.

Figure 21:
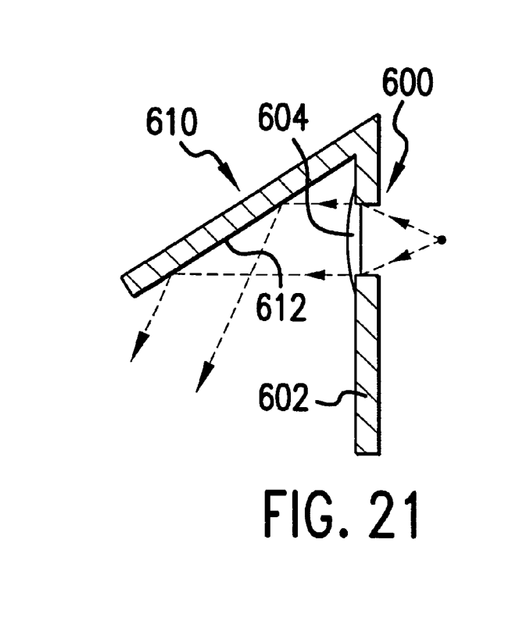
FIG. 21 is a partial schematic vertical section of a portion of yet another configuration of illumination re-directing attachment incorporating the instant invention.

FIG. 21 shows yet another embodiment of illumination enhancing and directing attachment 600. An annular base 602, of device 600, includes a number of collimating lenses 604 similar to those described hereinabove for attachment 550 of FIGS. 19 and 20, each disposed for alignment with a forward firing LED (also as described above for LED's 566). A peripheral shield 610 with an inner reflective surface 612 surrounds base 602 and is disposed at an angle with respect to base 602 so that when lenses 604 4receive light from their respective LED's such light is directed towards the symbology as described hereinabove for the embodiments of FIGS. 16–18 and 19 and 20.

Figure 22:
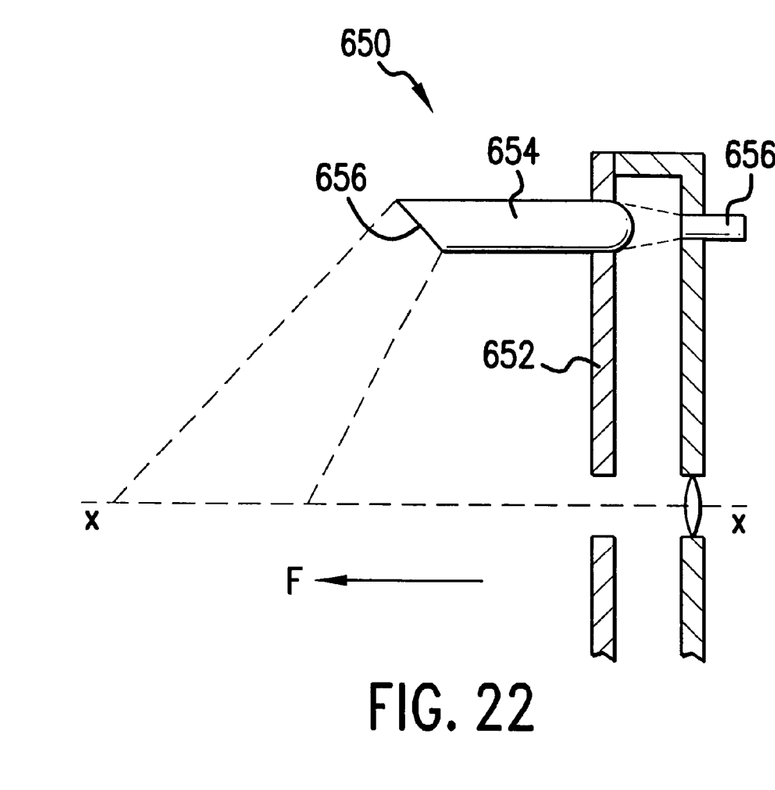
FIG. 22 is a partial schematic vertical section of a portion of yet still another configuration of illumination re-directing attachment incorporating the instant invention.

FIG. 22 shows still another embodiment of a "dark field" illumination enhancing and directing attachment 650 incorporating the instant invention. An annular base 652, of attachment 650 is provided with a number of transparent light directing rods 654; the number and disposition of such rods 654 corresponding to the number of forward firing "bright field" LED's 656 as described hereinabove for the other embodiments. Each rod 654 includes an end face 656 disposed at a selected angle to the horizontal. When rods 654 are disposed in alignment with their respective LED's 656 light from the LED's passes through the respective rods 654 and is directed by faces 656 thereof forward (in the direction of arrow F, FIG. 22) and towards center line x—x passing device 650. Attachment 650 is rotatably carried by the imager housing to either dispose rods 654 in alignment with LED's 656 or to remove rods 654 from such alignment. Attachment 650 otherwise functions to provide either "dark field" illumination or to permit "bright field" illumination from such LED's as described hereinabove for attachments 300 (FIGS.>16–18), 550 (FIGS. 19 and 20) and 600 (FIG. 21).

From the above description it will thus be seen that there has been provided new and novel apparatus' and methods for directing the illumination, provided by a symbology imager to illuminate coded symbology for imaging and decoding, so that such illumination may be selectively directed to provide either a first, or "bright field", illumination or a second, or "dark field" illumination. The apparatus' and methods involve providing either a readily insertable and removable illumination directing attachment for the images to redirect "bright field" illumination to "dark field" illumination, or to provide the imager with a component that may be selectively positioned to provide either the "bright field" illumination or the "dark field" illumination.

It is understood that although there has been shown and described preferred embodiments of the invention that various modifications may be made in details thereof without departing from the spirit as comprehended by the following claims.

What is claimed is:

1. An illumination directing device for use with an encoded symbology imager that can project at least one pattern of illumination to illuminate encoded symbology for imaging and decoding of the symbology, comprising a device body including a light transmissive portion that may be either selectively positioned to receive at least some of the illumination projected by the imager or selectively positioned not to receive the at least some of the illumination so projected by the imager; said light transmissive portion being configured so that when it is positioned to receive illumination it directs such illumination into an alternative pattern for illuminating encoded symbology.

2. The device of claim 1 wherein the at least one pattern of illumination that can be projected by the imager is a "bright field" pattern of illumination; said device body light transmissive portion directing said "bright field" pattern of illumination into a "dark field" pattern of illumination.

3. The device of claim 2 wherein the imager can project at least two different patterns of illumination, a first illumination pattern providing "bright field" illumination for the encoded symbology and a second illumination pattern providing "dark field" illumination for the encoded symbology; said device body further including a light obstructing portion as well as said light transmissive portion; said light obstructing portion, when said device is positioned to receive illumination from the imager, blocking transmission of the second illumination pattern while said light transmissive portion receives and directs the first, illumination pattern into said alternative illumination pattern.

4. The device of claim 3 wherein said alternative illumination pattern provides "dark field" illumination for encoded symbology.

5. The device of claim 4 wherein said alternative "dark field" illumination pattern is different from the "dark field" illumination pattern that would be provided by the imager as its second illumination pattern.

6. The device of claim 1 wherein the imager includes a housing with at least a portion that surrounds a housing opening from which light from the imager is projected to provide the at least one pattern of illumination; said device body including a peripheral configuration that provides for a snap fit within the housing portion surrounding the housing opening.

7. The device of claim 6 wherein the device body is disc-like in thickness.

8. The device of claim 5 wherein the imager includes a housing with at least a portion that surrounds a housing opening from which light from the imager is projected to provide the first illumination pattern and the second illumination pattern; said device body including a peripheral configuration that permits its disposition within the housing portion surrounding the housing opening.

9. The device of claim 8 wherein said peripheral configuration is sized and configured for a snap fit within said housing portion surrounding the housing opening that permits ready positioning of said device body therewithin and ready removal of said device body therefrom.

10. The device of claim 9 wherein said device body is disc-like in configuration and substantially circular in peripheral configuration; said light transmissive portion thereof comprising a first annular ring extending a predetermined amount in from said periphery and said light obstructing portion comprising a second annular ring extending from an inner circumference of said first annular ring inwardly towards a center of said device body; said device body further including circular light transmissive portion at its center.

11. The device of claim 10 wherein said light obstructing portion of said device body is provided by an annular ring of black light obstructing material adhered to a surface of said device body and said light transmissive portion comprises an annular ring with at least one of its annular surfaces of fresnel configuration to direct light from the imager forward of the imager and towards a center line through said circular light transmissive portion at the center of said device body.

12. The device of claim 11 wherein the imager includes a plurality of first illumination devices arcuately spaced one from the other in a circle and disposed to direct their light through said housing opening and said light transmissive annular ring of said device body aligns with and receives light from the imager first illumination device.

13. The device of claim 12 wherein the first illumination devices of the imager are each light emitting diodes (LED's).

14. The device of claim 13 wherein said configuration of said first annular ring includes arcuate fresnel segments separated by arcuate light passage segments which permit passage of light therethrough without changing the illumination pattern thereof, there being one such fresnel segment and one such light passage segment for each of the LED's; said device body being disposed with respect to the imager to permit selective rotation of the device body between a first disposition with said arcuate fresnel segments aligned to receive light from the LED's and a second disposition with said arcuate light passage segments aligned to receive light from the LED's.

15. The device of claim 2 wherein the imager includes a housing with a housing opening and a plurality of light emitting diodes (LED's) arcuately separated one from the other and disposed in a circle to provide the at least one pattern of illumination; said device body having a circular configuration that includes a base received within the housing opening and further including a plurality of light collimating lenses carried by said base and arcuately spaced one from the other in a circle, there being one of said collimating lenses for each of the LED's; said device body being selectively positionable between a first disposition with each of said collimating lenses aligned with an LED to receive light therefrom and a second disposition with said collimating lenses not aligned with the LED's but instead permitting light from the LED's to pass through said base; said device further including light directing means disposed to receive light from said collimating lenses and direct the light forward of the device and towards a center line passing through the device.

16. The device of claim 15 wherein said light directing means includes mirror like reflection means to receive light from the LED's.

17. The device of claim 16 wherein said reflection means comprises a circular shield carried by said device spaced from said base and disposed of a predetermined angle with respect thereto.

18. The device of claim 17 wherein said reflection means includes a plurality of individual light reflecting flaps carried by said device and disposed spaced one from the other with each of said flaps aligned with a collimating lens and including a mirror like finish on a surface thereof that receives light from its respective collimating lens and directs light into said alternative illumination pattern.

19. The device of claim 15 wherein said light directing means includes a plurality of light transmissive rods, there being one rod for each of said collimating lenses, said rods each including a first end disposed to receive light from its collimating lens and a second end configured to direct the light so received into said alternative pattern.

20. The method of changing the illumination pattern provided by an encoded symbology imager that can provide at least one illumination pattern for illuminating symbology to be imaged and decoded; comprising:
  a) receiving from the imager light intended to provide a first illumination pattern; and
  b) directing the light so received from the imager into an alternative illumination pattern.

21. The method of claim 20 wherein the first illumination pattern provides "bright field" illumination and the alternative illumination pattern provides "dark field" illumination.

22. The method of claim 21 wherein said steps of directing the light into said alternative illumination pattern is to be selectively utilized.

23. The method of claim 22 where in the images can provide a first illumination pattern and/or a second illumination pattern and further including blocking light from the images providing at least one of said illumination patterns while receiving light from the imager intended to provide the other illumination pattern and directing said light into said alternative illumination pattern.

24. The method of claim 23 wherein the first illumination pattern is to provide a "bright field" illumination for illuminating symbology and the second illumination pattern is to provide a "dark field" illumination for illuminating symbology; said blocking of light from the imager blocks the "dark field" illumination while providing said alternative illumination pattern provides an alternative "dark field" illumination pattern for illuminating symbology.

* * * * *